United States Patent [19]

Berney

[11] 4,110,968

[45] Sep. 5, 1978

[54] CONTROL FOR A STEP MOTOR FOR THE MEASUREMENT OF TIME

[76] Inventor: Jean Claude Berney, Chemin du Bois de Menton, Epalinges, Switzerland

[21] Appl. No.: 742,524

[22] Filed: Nov. 16, 1976

[30] Foreign Application Priority Data

Nov. 18, 1975 [CH] Switzerland .................. 14900/75

[51] Int. Cl.² .............................................. G04C 3/00
[52] U.S. Cl. ..................................... 58/23 A; 318/129
[58] Field of Search ............... 58/23 R, 23 A, 23 BA; 307/225 R, 220; 363/59–60; 318/129–130

[56] References Cited

U.S. PATENT DOCUMENTS

| | | | |
|---|---|---|---|
| 3,363,410 | 1/1968 | Mahashi | 58/34 |
| 3,668,860 | 6/1972 | Diersbock | 58/23 BA |
| 3,906,256 | 9/1975 | Suzuki et al. | 307/225 R |
| 3,937,003 | 2/1976 | Busch et al. | 58/23 D |
| 3,955,353 | 5/1976 | Astle | 58/23 BA |
| 4,014,165 | 3/1977 | Barton | 58/23 BA |

Primary Examiner—Gene Z. Rubinson
Assistant Examiner—Vit W. Miska
Attorney, Agent, or Firm—Haseltine, Lake, & Waters

[57] ABSTRACT

A step motor in a horological device is connected in a control circuit such that the motor is fed by a battery under the control of a reference oscillator, a frequency divider, a power stage and a shaper. The power stage comprises MOS power transistors exclusively of N-MOS type connected in pairs such that one transistor has its emitter connected to one terminal of the battery and its collector connected to one terminal of the motor coil and to the emitter of the second transistor, whereas the second transistor has a collector connected to the other terminal of the battery. The shaper delivers voltage to the power transistors via a voltage booster in the form of a capacitor so that the control pulses are of a voltage much higher than the voltage of the battery itself. When the motor is of bi-polar type a second pair of power transistors is connected to the other terminal of the coil in similar fashion.

3 Claims, 1 Drawing Figure

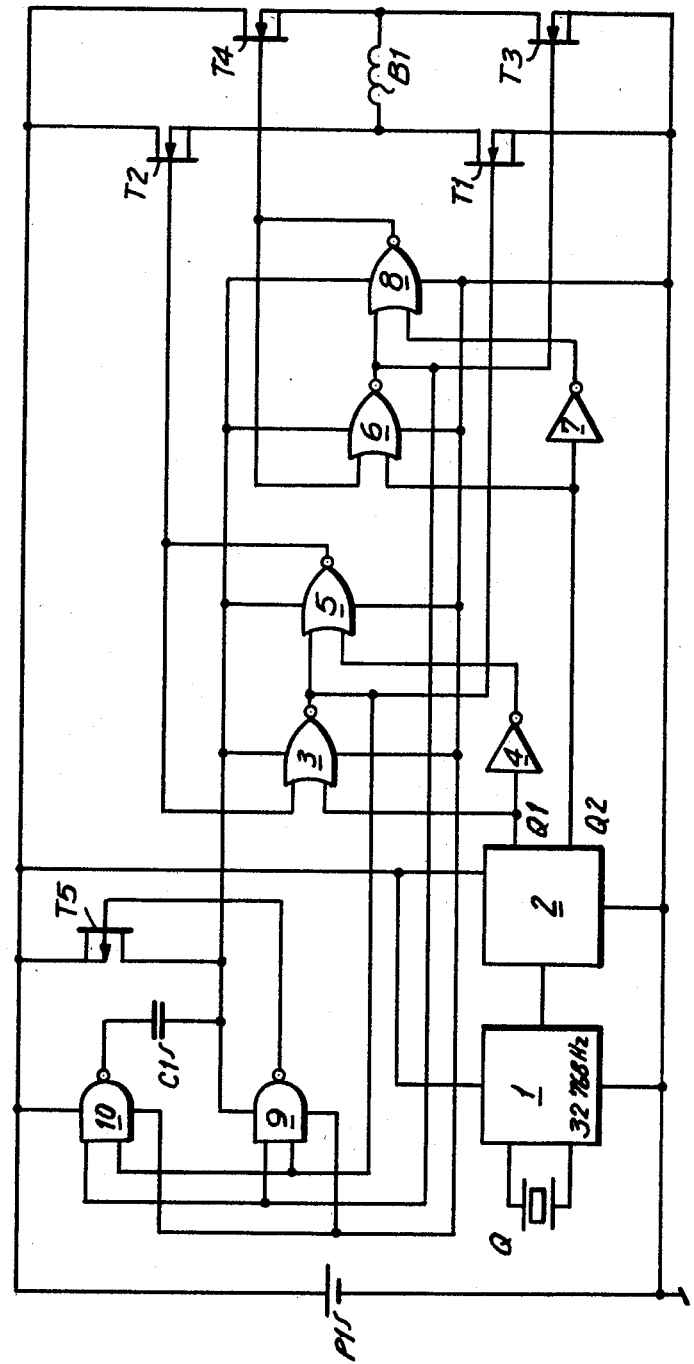

CONTROL FOR A STEP MOTOR FOR THE MEASUREMENT OF TIME

FIELD OF THE INVENTION

The invention relates to a control circuit for a step motor in a horological device.

BACKGROUND

Most of the current watches and clocks having a quartz crystal utilize a step motor which has a motor coil of small impedance which receives pulses delivered by an integrated electronic circuit comprising a reference oscillator, a frequency divider, a pulse shaper and a power stage. The power stage is generally composed of complementary MOS transistors, i.e. of N-MOS type and P-MOS type. However, transistors of P-MOS type are poorly suited for power use and it is necessary to make them very large in size if one wishes to avoid substantial loss at their terminals. Also, it is known that P-MOS transistors used alone for power supply occupy 30–50% of the total surface area of the integrated circuit. This affects the cost of the circuit, since it is approximately proportional to the square of its surface area. A significant economical saving could be realized if these power transistors of P-MOS type could be eliminated.

SUMMARY OF THE INVENTION

An object of the present invention is to provide a power supply which avoids the need for use of transistors of P-MOS type. In accordance with the present invention, there is provided in a control of the step motor for the measurement of time fed by a single battery and comprising a reference oscillator, a frequency divider, a power stage and a shaper delivering necessary pulses to the control of the latter, an improvement wherein power transistors of MOS type are all of N-MOS type and are connected in pairs, the emitter of one being connected to a terminal of the battery, its collector being connected to one of the terminals of the motor coil and to the emitter of the other, and the collector of this latter being connected to the other terminal of the battery, the shaper permitting, through the intermediary of a voltage booster comprising at least one capacitor, delivery to the bases of the power transistors, according to need, of voltage control pulses higher than the voltage of the battery.

BRIEF DESCRIPTION OF THE DRAWING

The single FIGURE of the drawing shows, by way of example, a circuit diagram for carrying out the control according to the invention. The motor is of alternating type and is adopted to receive a positive pulse then a negative pulse, etc.

DETAILED DESCRIPTION

The circuit comprises quartz crystal Q and its oscillator 1 which feeds a frequency divider 2 which delivers at its output Q1 positive even pulses and at its output Q2 positive odd pulses. The output Q1 is connected, on the one hand, to an input of NOR gate 3 and, on the other hand, to the inut of an inverter 4 whose output is connected to a input of the NOR gate 5. The output Q2 is connected, on the one hand, to an input, of the NOR gate 6 and, on the other hand, to the input of an inverter 7 whose output is connected to an input of the NOR gate 8. The output of the gate 3 is connected to the second input of the gate 5, to one input of NAND gate 9, to one input of NAND gate 10 and to the base of power transistor T1 of N-MOS type. The output of the gate 5 is connected to the second input of the gate 3 and to the base of N-MOS power transistor T2. The output of the gate 6 is in turn connected to the second input of the gate 8, to the second input of the gate 9, to the second input of the gate 10 and to the base of N-MOS power transistor T3. The output of the gate 8 is finally connected to the second input of the gate 6 and to the base of N-MOS power transistor T4.

The emitter of transistor T1 is connected to the negative terminal of the battery P1 and its collector is connected to one of the terminals of the motor coil B1 and to the emitter of T2. The collector of transistor T2 is connected to the positive terminal of the battery. The emitter of transistor T3 is connected to the negative terminal of the battery and its collector is connected to the other terminal of the motor coil and to the emitter of transistor T4. The collector of T4 is connected to the positive terminal of the battery. The output of the gate 9 is connected to the base of P-MOS transistor T5 whose emitter is connected to the positive terminal of the battery and whose collector is connected to a terminal of a capacitor C1 and to the positive feed terminals of the gates 3, 5, 6, 8 and 9. The output of gate 10 is connected to the other terminal of the capacitor C1. The battery P1 directly feeds the oscillator 1, the divider 2 and the gate 10.

The operation of the circuit is as follows:

In the absence of pulses at Q1 and Q2, the outputs of inverters 4 and 7 are in state 1. The outputs of the gates 5 and 8 are in state 0 and the outputs of the gates 3 and 6 are in state 1, as are the two inputs of NAND gates 9 and 10. The outputs of these gates are, therefore, also in 0 state. The transistor T5 is conductive. The potential at its collector is equal to the voltage of the battery $V_p$. The capacitor is, therefore, charged to the voltage $V_p$. The power transistors T1 and T3 are conductive. The current in the motor coil B1 is 0. When a positive pulse appears at Q1, the output of the inverter 4 changes to 0 state, as does the output of gate 3. The transistor T1 is no longer conductive. The output of the gate 9 passes to state 1 and the transistor T5 is no longer conductive. Similary, the output of gate 10 passes to $+V_p$. As the capacitor C1 has been charged to $+V_p$, the voltage at the collector of T5 passes to $+2V_p$ and thereby also the feed voltage of gates 3, 5, 6, 8 and 9. The voltage at the output of gates 5, 6 and 9 will, therefore, be equal to $2V_p$. The collector-emitter voltage of T2 is, thus, positive. T2 and T3 are conductive. T1 and T4 are non-conductive. The emitter of T2 is at $2V_p$, the collector of T3 at 0. The coil receives positive current during the time of the pulse. When a pulse appears at Q2, the output of the inverter 7 passes through 0 state, as does the output of gate 6. The transistor T3 no longer is conductive. The outputs of gates 9 and 10 change over to state 1, the transistor T5 is cut and the voltage at its collector passes to $+2V_p$. The collector-emitter voltage at T4 is positive. T4 and T1 are conductive and T2 and T3 are non-conductive. The emitter of T4 is at $+V_p$, the collector of T1 at 0. The coil receives a negative current during the duration of the pulse. In the case described hereinabove, the voltage booster only gives a double voltage during the duration of the pulses. One can obviously ultize a voltage booster which delivers double voltage permanently.

When the motor is of monopolar type, one can eliminate the transistors T3 and T4, the inverter 7 and the gates 6 and 8. One of the terminals of the coil is connected to the collector of T1 and to the emitter of T2. The other terminal of the coil is connected to the negative terminal of the power supply.

What is claimed is:

1. In a control circuit for a step motor in a horological device wherein the motor is fed by a battery and the circuit is provided with a reference oscillator, a frequency divider, a power stage and a shaper for delivering pulses to control the power stage, an improvement wherein said circuit comprises MOS power transistors exclusively of N-MOS type connected in paired arrangement such that one N-MOS transistor has an emitter directly connected to one terminal of the battery, and a collector directly connected to one terminal of the motor coil and directly to the emitter of the second N-MOS transistor, said second N-MOS transistor having a collector directly connected to the other terminal of the battery, and a voltage booster coupled to said shaper for delivering to the power transistors control pulses of a voltage much higher than the voltage of the battery.

2. A control circuit as claimed in claim 1 wherein said voltage booster comprises a capacitor.

3. A control circuit as claimed in claim 2 comprising a second pair of N-MOS power transistors connected to the other terminal of said coil.

* * * * *